United States Patent [19]
Levinson

[11] Patent Number: 5,925,394
[45] Date of Patent: *Jul. 20, 1999

[54] METHODS FOR DENATURING AND WHIPPING INTO A FOAM PROTEIN CERTAIN DENATURABLE PROTEINS FOUND IN MILK PRODUCTS, EGG PRODUCTS AND MEAT PRODUCTS

[76] Inventor: Melvin L. Levinson, 8 Stratford Cir., Edison, N.J. 08820-1830

[ * ] Notice: This patent issued on a continued prosecution application filed under 37 CFR 1.53(d), and is subject to the twenty year patent term provisions of 35 U.S.C. 154(a)(2).

[21] Appl. No.: 08/746,809

[22] Filed: Nov. 18, 1996

Related U.S. Application Data

[63] Continuation-in-part of application No. 08/370,425, Jan. 9, 1995, abandoned.

[51] Int. Cl.$^6$ ................................. A23J 3/00; H05B 6/00
[52] U.S. Cl. ........................... 426/241; 426/568; 426/570
[58] Field of Search ..................................... 426/564, 568, 426/570, 474, 660, 241

[56] References Cited

U.S. PATENT DOCUMENTS 4,409,249  10/1983  Forkner ..................................... 426/568

FOREIGN PATENT DOCUMENTS

59-183672  10/1984  Japan ..................................... 426/568

*Primary Examiner*—George Yeung

[57] ABSTRACT

Certain denaturable protein food products can be whipped into a stable foam product. These include milk products such as whole milk, skim milk, cream, half-and-half, evaporated milk and reconstituted powdered milk; and egg products including whole eggs, egg yolks, egg whites and reconstituted dried egg products including whole eggs, egg yolks, egg whites; and uncooked meat products such as finely divided muscle and blood. The un-denatured food products are concurrently denatured and whipped into a foam. The denaturing results from heating, altering the pH, and/or adding denaturing agents such as rennet. The products are identified as PRO-WHIP and include, for example, whipped milk products, whipped egg products, and whipped meat products alone and in various combination with coffee, tea, chocolate or fruit juices.

31 Claims, 4 Drawing Sheets

METHODS FOR DENATURING AND WHIPPING INTO A FOAM PROTEIN CERTAIN DENATURABLE PROTEINS FOUND IN MILK PRODUCTS, EGG PRODUCTS AND MEAT PRODUCTS

CROSS REFERENCE TO RELATED APPLICATIONS

This application is a continuation-in-part of my U.S. patent application Ser. No. 08/370,425, filed Jan. 9, 1995, now abandoned.

BACKGROUND OF THE INVENTION

Field of the Invention—The present invention relates to methods and apparatus for denaturing proteins, found in milk and eggs, and whipping them into a stable, expanded foam product. Herein this expanded foam, whipped product is entitled "PRO-WHIP". The product, PRO-WHIP, may be used as a food or confection. It may be employed as an additive to enhance other foods, for example, as an edible topping on coffee, cereal, cake, pie and ice cream.

This invention concerns methods for preparing stable, expanded foamed food products from raw food products containing undenatured animal protein which can be denatured. Such denaturable protein food products include:

milk products, e.g., whole milk, low-fat milk, skim milk, cream, half-and-half, reconstituted powdered milk, and evaporated milk;

egg products including shelled whole eggs, egg whites, egg yolks, reconstituted dried whole eggs, reconstituted dried egg white, reconstituted dried egg yolk;

uncooked meat including finely divided beef, chicken, turkey, and animal blood.

All of these products can be denatured by controlled heating and/or by altering the pH of the material. Denaturing also can be achieved by adding denaturing agents such as rennet to the undenatured food protein.

According to this invention, the described food products are concurrently denatured and whipped into a stable foam product which can be employed as a food. The foamed milk products are useful as desserts, confections, and novel milk substitutes. The foamed egg products have a variety of uses primarily as novel desserts and confections and additives to other food products. The foamed meat products can be employed as novel delicatessen products for spreading or slicing.

The invention concerns new egg and/or milk beverages and desserts. PRO-WHIP may be alcoholic or non-alcoholic and may be served hot, chilled or frozen. Names coined for different formulations PRO-WHIP (i.e. "Milk-Whip", "Egg-Whip" and meat "Pro-Whip") follow:

- Milk-Whip Coffee, Egg-Whip Coffee, Pro-Whip coffee—(regular or espresso)
- Milk-Whip tea, Egg-Whip tea, Pro-Whip tea
- Milk-Whip chocolate, Egg-Whip chocolate, Pro-Whip chocolate
- Milk-Whip drinks, Egg-Whip drinks, Pro-Whip drinks—(drinks with citrus fruit)
- Milk-Whip desserts, Egg-Whip desserts, Pro-Whip desserts (hot, warm or chilled)
- Milk-Whip alcoholic drinks, Egg-Whip alcoholic and Pro-Whip alcoholic drinks
- Milk-Whip, Egg-Whip and Pro-Whip alcoholic chilled and frozen desserts
- Milk-Whip whipped cream, Egg-Whip whipped cream, Pro-whip whipped cream
- Egg-Whip egg white, Egg-Whip egg yolk, Egg-Whip whole egg
- Combinations of the above
- By-products generated in the production of Milk-Whip, Egg-Whip and Pro-Whip.

The invention concerns novel products generated in the production of a PRO-WHIP, for example, "foamed ice cream"; "denatured whipped cream"; "whipped whole egg"; "whipped egg cream"; "whipped coffee espresso cream"; "whipped tea milk"; "whipped chocolate milk"; "PRO-WHIP alcoholic drinks" and "PRO-WHIP alcoholic desserts." The invention includes novel double-boiler apparatus, filtering apparatus, freezing apparatus and storing apparatus. The invention concerns methods for preparing and storing PRO-WHIP.

DEFINITIONS

"Milk products" refer to fresh milk, pasteurized milk cream, mixture of milk and cream (known as "half-and-half"), homogenized milk, low-fat milk, skim milk, evaporated milk, soft unripened cheese (for example cottage cheese also known as "farmer's cheese") and reconstituted powdered milk. A milk PRO-WHIP may include polyunsaturated oil in addition to or in place of the saturable fat found in milk.

"Egg products" refer to shelled eggs, per se, and egg yolks, per se, and egg whites, per se.

"Denaturable protein food products" refer to proteins, found in milk, egg, meat and blood products, that can be denatured by altering their pH, by heat, or by mechanical agitation. The denaturing may result from various combinations of heating, mechanical agitation, and changing the pH. Other known methods of denaturing may be employed, for example, heating rennet and milk and, before the milk curdles, mechanical whipping it into a foam.

"Whipping" refers to high shear agitation of a fluid that introduces air bubbles into the fluid, creating a "foam". Whipping occurs in food blenders, table-supported rotary mixers and hand-held rotary mixers operating at high speeds.

"Beating" refers to gentle agitation that achieves homogeneity of a fluid. Beating occurs in table-supported rotary mixers, hand-held rotary mixers at low speed and also by manual agitation with a spoon, spatula, fork or similar utensils.

DESCRIPTION OF THE PRIOR ART

Some believe that it is the whey protein in milk that is the primary factor in whipping milk products into a foam. Some believe that it is the casein protein that is the primary factor in whipping milk products into a foam. It is taught that a protein identical or similar to a protein in milk is present in eggs and blood.

It is well known to whip into a foam, powdered milk, evaporated milk or heavy cream. It is known that, unexpectedly and undesirably, when some batches of these milk products are whipped into a foam, the foam prematurely collapses.

It is known to chill and to add flavoring, sweeteners, candy, nuts and fruits to whipped foam products. It is known to partake of these foamed milk products alone or as part of a confection. It is known that different batches of these milk products unexpectedly do not whip into a useful foam.

Prior art teaches that the success rate in whipping cream is improved if the cream is first chilled. Prior art teaches that, when whipping egg white, one must make sure that no yolk is present.

Unless chemical stabilizers and the like are added, it is not known to hard freeze whipped skim milk, evaporated milk or heavy cream so that the frozen product may be readily scooped and served in the same manner as one readily scoops ice cream. It is know that: (a) during freezing, whipped skim milk develops an ice layer on the bottom of the freezer container and develops ice crystals throughout the frozen mix; (b) whipped heavy whipping cream freezes into a rigid mass that is difficult to penetrate with a spoon or scoop; and (c) these whipped products defrost non-uniformly.

There is extensive prior art concerning milk and egg products. Examples follow:

(1) "Fundamentals of Dairy Chemistry," Second Edition, 1974, Webb, Johnson and Alfred, Avi Publishing Co., Inc., Westport, Conn., which describes the many ingredients of milk, their iso-electric points, denaturing times and temperatures.

(2) "On Food and Cooking," 1988, by Harold McGee, Collier Books, MacMillan Publishing Co., New York, which contains a section "The Science and Lore of the Kitchen," Chapter I, Milk and Dairy products and Chapter II, Eggs.

(3) "Food Fundamentals," Fourth Edition, 1985 by Margaret McWilliam, MacMillan Publishing Co., New York that teaches: (a) Milk—"denaturing, scum formation, scorching, curdling, clotting of milk, whipped cream, evaporated milk foams, and non-fat dried milk foams," and (b) Eggs:—"denaturing" and "foams".

Prior art devices relevant to this invention include:

(1) An ice cream maker (U.S. Pat. No. 4,488,817, SUSUMU UESAKA et al 1984) that comprises an outer vessel and inner vessel having an annular space there between. The annular space is filled with a freezing mixture. Ingredients for making ice cream are placed in the inner vessel. The ingredients freeze while they are slowly stirred with paddles that one operates manually or with an electric motor.

(2) A heavy duty, high speed electric mixer with a spatula attachment, for example, Model 197147-92 manufactured by Black & Decker Inc., Shelton, Conn.

(3) A double boiler having an inner pot fixed within an outer pot.

(4) A French press, plunger type coffee maker.

STATEMENT OF THE PRESENT INVENTION

The present invention describes methods and apparatus, for denaturing and whipping into a useful, stable, high-volume, long lasting foam product, eggs, milk, meat and blood. Certain denaturable food products that, in their natural state, do not whip into a useful, stable, high-volume, long lasting foam, for example, whole milk and whole shelled eggs, are denatured and whipped into useful, stable, high-volume, long lasting foams. Food products, partially denatured during their manufacture, that are known to whip into a foam, as powdered milk and condensed milk, are further denatured to achieve longer-lasting, larger-volume foams. Heavy cream, that whips into a foam because of its high fat content, is denatured to achieve a larger-volume, longer-lasting foam. Egg whites that are conventionally whipped into useful foams are further denatured to reduce the required whipping time and to provide a larger-volume, longer-lasting useful foam.

The high volume, long-lasting, foam products described may have a low calorie, low fat content when prepared, for example, from skim milk or re-constituted powdered milk. They may have a high calorie, high fat content when prepared from mixtures of egg, evaporated milk, cream and oil or fat. They may be consumed hot, cold or frozen.

The present invention teaches to whip an egg or milk product, while it is denaturing, into a PRO-WHIP. Alternately, the present invention teaches to partially denature an egg or milk product and store it as a PRO-WHIP SYRUP and, thereafter, as desired, recover and whip individual portions of this PRO-WHIP SYRUP into a PRO-WHIP.

An object of the invention is to denature a protein found in meat, blood, eggs and milk so that it may be whipped into a useful foam.

An object of the invention is to denature a mixture of a whole shelled egg and a liquid and, before it is fully denatured, to whip it into a useful, edible foam.

It is a further object of the invention to provide methods for making low, intermediate and high-calorie PRO-WHIP. A PRO-WHIP, when hot, may be applied to a hot breakfast cereal. A PRO-WHIP may be sweetened and/or flavored and used as a replacement for the milk or cream commonly added to dry breakfast cereal. A PRO-WHIP may be used as a chilled topping on ice cold soda, tea, coffee, and ice cream. A PRO-WHIP may be served frozen as a replacement or substitute for ice cream, frozen yogurt and the like. A PRO-WHIP may be served in edible cones and in sodas and shakes. A PRO-WHIP may be applied as a topping for waffles, as a filling or frosting for cake and as a topping or accompaniment to dessert pies. Additives, such as strawberry jelly, apple sauce, chocolate syrup, butterscotch syrup, and flavorings (i.e., vanilla, cinnamon), may be whipped into a PRO-WHIP and the resulting mixture frozen and, thereafter, served as a dessert.

Another object of the invention is to provide apparatus and methods for making a whipped denatured protein alcoholic drink or an alcoholic "ice cream" dessert.

Another object of the invention is to provide apparatus and methods for making a denatured "whipped coffee milk" that is: (1) similar to cappuccino coffee when hot; (2) similar to a coffee milk shake when cool; and (3) similar to coffee ice cream when frozen.

A further object of the invention is to provide apparatus and methods for making a denatured "whipped tea milk" that may be served hot, cold or frozen.

A still further object of the invention is to provide apparatus and methods for making a "whipped chocolate milk." A chocolate milk PRO-WHIP is similar to hot chocolate when hot. It is similar to a chocolate milk shake when chilled. It appears and tastes like chocolate ice cream when frozen.

It is an object of the invention to provide a food that certain persons, for example, persons allergic to milk, may consume without discomfort.

A further object of the invention is to provide methods for preparing and rigidly freezing a whipped, frozen product, for example, whipped, flavored heavy cream, in an open-top, microwave-reflective, freezing-serving container. The container may be exposed to microwave energy to restore individual serving portions of the rigidly frozen product to a soft, ready to eat, condition.

To retard freezer bum during cold storage, it is a further object of this invention to provide covers that are interchangeable as dessert dishes.

An object of this invention is to provide a novel, milk and egg, partially frozen or hard frozen confection that is inexpensive and is quickly and conveniently prepared. This confection may be employed either as a replacement or as a substitute for conventional whipped cream, ice cream, ice milk, sherbet, frozen yogurt and the like. This invention provides a foamed confection that is similar to whipped cream. When frozen, this foamed confection is similar to ice cream in taste, texture and consistency. This foamed confection may be scooped and served in the manner of either whipped cream or ice cream, i.e., in or on cones, banana splits, sundaes, sodas, and the like.

An object of the invention is a new product, a novel "foamed cheese".

SUMMARY OF THE INVENTION

A protein in whole milk, skim milk, low-fat milk, evaporated milk, eggs, meat or blood is denatured and while it is denaturing the protein is whipped into a useful, stable foam. A foam that has a remarkable ability to remain in a foamed state. Compared to its unwhipped volume, the volume of a PRO-WHIP foam may increase two to eight fold. A three-fold volume increase means that 100 volume units of PRO-WHIP SYRUP yields 400 volume units of PRO-WHIP.

A protein may be denatured by altering its pH, by heat, by mechanically agitation and other conventional means, for example:

EGG—An egg product is heated to the denaturing temperature of its protein and maintained at this denaturing temperature for a preselected time. The denaturing temperature of the egg protein is circa 150° F. Preferably, before or during whipping it into a foam, a shelled whole egg and a liquid are heated to at least 160° F. to kill any Salmonella bacteria present. Surprisingly a whole shelled egg, a product that does not normally whip into a foam, when denatured and whipped as taught herein, whips into a lasting, useful foam.

MILK—A milk product is denatured and while the milk product is denaturing and before it is fully denatured, the milk product is whipped into a PRO-WHIP. Surprisingly, whole milk, a product that does not normally whip into a foam, when denatured as taught herein, whips into a lasting, useful foam. The denaturing may result from either 1) heating the milk product to its denaturing temperature and maintaining it at its denaturing temperature for a preselected time or 2) lowering its pH to circa the iso-electric point of its whey protein.

If the denaturing milk product contains a small quantity of milk fat, it can be whipped, warm, into a PRO-WHIP. When a partially heat-denatured milk product is rich in butter fat, for example, light cream, preferably, it is chilled prior to whipping.

A PRO-WHIP can be used directly as a food, confection or dessert. Additives may be whipped into the PRO-WHIP, e.g., sugar, flavorings, fruits, nuts, jellies, jams, preserves, solid flavorings such as chocolate chips, candies, and the like. Carbonated soda may be mixed into a PRO-WHIP.

A PRO-WHIP, with or without additives, may be employed as a topping for other foods. It may be used as a topping (1) on hot or ice coffee, tea; (2) on a hot chocolate or cold chocolate drink; (3) on milk shakes, sodas, pies, and cakes; and (4) on other foods for which conventional whipped cream is employed.

A PRO-WHIP can be a novel flavored, whipped foam cheese. A PRO-WHIP may be an alcoholic beverage or a frozen alcoholic dessert.

A PRO-WHIP SYRUP may be frozen and stored in a freezer. Thereafter, suitable quantities of the chilled PRO-WHIP SYRUP may be recovered and whipped into a PRO-WHIP.

A frozen PRO-WHIP may be retained, for extended storage periods, in bulk (e.g., large containers) or in multiple, individual serving units.

DESCRIPTION OF THE PREFERRED EMBODIMENTS

The present invention relates to methods and apparatus for denaturing protein, found in milk, eggs and meat, and while it is denaturing, whipping the milk, eggs or meat into an expanded foam product entitled herein "PRO-WHIP". The denaturable protein food product may be partially denatured to produce a whipping liquid. This whipping liquid is entitled herein "PRO-WHIP SYRUP". A PRO-WHIP SYRUP may be stored for future use. Prior its use, the protein in a partially denatured PRO-WHIP SYRUP is further denatured mechanically by the blades of a whipping apparatus and is whipped into PRO-WHIP.

Egg-milk, and egg or milk PRO-WHIPS may be produced that simulate in taste, appearance and utility, whipped natural heavy cream. Natural heavy-cream may be denatured and whipped into a heavy-cream PRO-WHIP.

There follows several ways that a PRO-WHIP differs from a conventional whipped cream:

(1) The volume of unwhipped heavy whipping cream when whipped is about 150%. In contrast, the expected volume increase of a PRO-WHIP is usually 400% to 700%.

(2) Because of the large amount of animal fat present, the prior art teaches cooling heavy whipping cream prior to whipping. In contrast, a vegetable-fat PRO-WHIP SYRUP can be whipped hot or cold.

(3) Whipped heavy cream freezes into a hard mass that cannot be easily hand scooped from its container. In contrast, vegetable-fat PRO-WHIP can be easily hand scooped from its container.

(4) Some persons, allergic to one or more substances in whole milk, experience digestive discomfort after ingesting whipped cream. These same persons may eat an egg PRO-WHIP without experiencing this digestive discomfort.

(5) A chilled, heavy-cream PRO-WHIP SYRUP will whip into a larger volume "whipped cream PRO-WHIP" than will an identical amount of untreated heavy whipping cream. Note: the volume of a "whipped heavy cream PRO-WHIP" and conventional whipped cream are both small compared to the volume of other PRO-WHIPS. Since heavy cream is forty percent fat, only the remaining sixty percent milk expands into a foam. A "whipped cream PRO-WHIP" is more stable than a conventional whipped cream.

(6) If a natural cream is whipped into a PRO-WHIP, it may destabilize the foam. In contrast, after a cream is processed into a denatured PRO-WHIP SYRUP, it may be employed as an additive to flavor and enrich other PRO-WHIP denaturable protein food products.

If whole milk is whipped without first denaturing it, the resulting bubbles rapidly disappear. Unexpectedly, when whole milk is whipped while it is denaturing, it whips into a useful, stable foam.

Representative procedures to denature or further denature reconstituted powdered milk, evaporated milk, whole milk, half and half, light cream and heavy cream follow:

A. Heat Denaturing Milk Products

Figure 2:
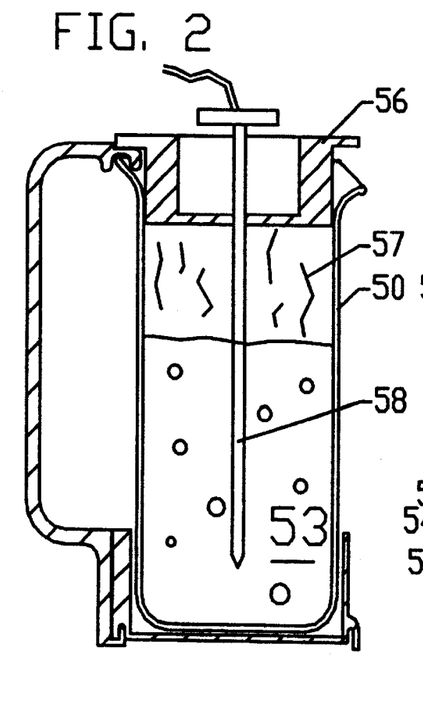
FIG. 2 is a side view, cross-section of a heat treating device with a microwave oven temperature probe.

In FIG. 2, a cylindrical container 50 contains the natural milk product 53. Preferably, during heat denaturing, a first cover 56 covers container 50 so that steam 57 emitted from natural milk product 53 will displace the ambient air, above natural milk product 53. Optionally, a microwave oven temperature probe 58 is inserted through first cover 56 into natural milk product 53 when product 53 is exposed to microwave energy. If natural milk product 53 in container 50 is heated over a gas or electric burner, temperature probe 58 may be a common metal thermometer. Once the heating time to denature the protein, in a measured amount of milk, is determined, temperature probe 58's value in signaling an impending boil over is minimized. Different milk products "boil" at different temperatures. The temperature probe 58 aids in learning the time it takes to reach these temperatures and thereafter the microwave oven may be programmed accordingly.

Figure 3:
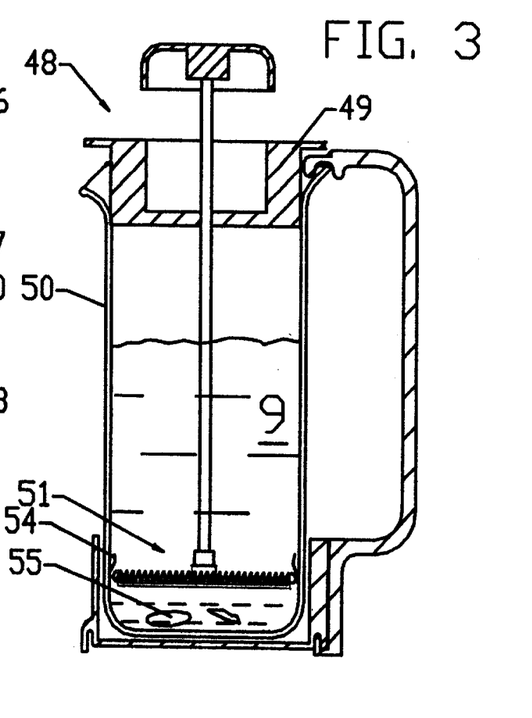
FIG. 3 is a side view, cross-section illustration of the heat treating device of FIG. 2, where the temperature probe is replaced by a plunger-strainer.

FIG. 3 illustrates a plunger-strainer type filtering device 48 where a second cover 49 covers the cylindrical container 50 of FIG. 2. In the heat processed milk product of FIG. 2, plunger and filter 51 operates through cover 49 to drive to the bottom of container 50, solids. Unfiltered components 55, for example coffee grounds or tea leaves, of processed milk product 52 are trapped beneath plunger and filter 51. The resultant filtered component of heat denatured milk product 52 is PRO-WHIP SYRUP 9. Device 48 is similar in structure (i.e., container and plunger-strainer) to a conventional, French-press, plunger coffee maker.

In operation, in FIG. 2, in container 50, natural milk product 53 is heated, in a microwave oven, until it boils. Then, the power level, of the microwave oven, is reduced to a predetermined level and the milk product is allowed to simmer for a predetermined time, for example from seconds to 20 minute. Thereafter, this heat-denatured milk product is removed from the heat source.

In operation, in FIG. 3, when the starting milk product contains unwanted matter, for example, coffee grounds or tea leaves, first cover 56 is removed and replaced by second cover 49 and plunger and filter 51. Then, in container 50, plunger and filter 51 is slowly pushed, to the bottom of container 50. Whereupon, the resulting PRO-WHIP SYRUP is poured off into a suitable container and there, as desired, either whipped or stored for future use.

Figure 4:
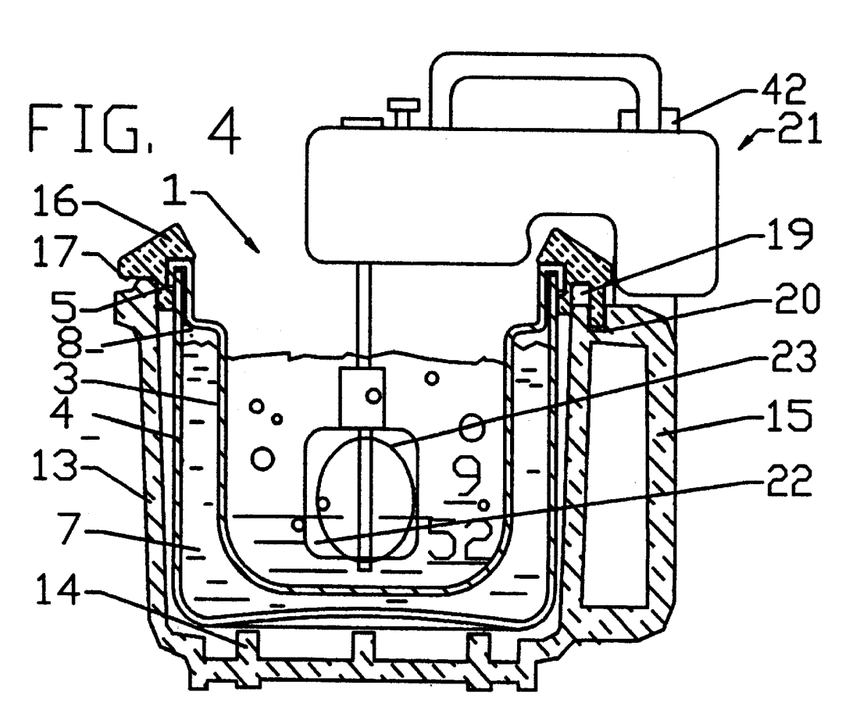
FIG. 4 is a side view illustration, partly in cross-section, of a whipping, freezing and/or serving container and a high-speed, electric mixer.
Figure 7:
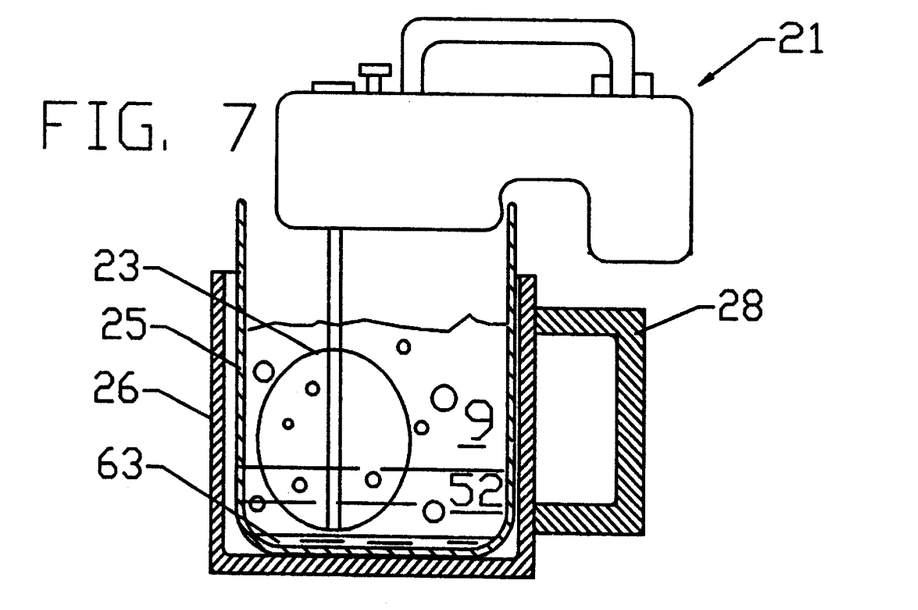
FIG. 7 is a side view illustration, partly in cross-section, of a high-speed electric mixer operating in a single serving cup. The cup may be one cup of a set of identical cups for use with the same mixer.

As illustrated in FIGS. 4 and 7, the resulting PRO-WHIP SYRUP 52 (shown in long dashed lines) is whipped into PRO-WHIP foam 9, flavored and utilized. Surprisingly, the soft skin that forms on a warm denaturing milk, easily whips into and become a useful part of a PRO-WHIP.

The boiling point of natural milk product 53, may occur at temperatures substantially below the boiling point of water. For example, a milk product 53 may start to boil at 160° F. Thereupon, during a simmer period, the temperature of the milk product is allowed to slowly rise, further denaturing its protein. It is taught that 80% of the whey protein denatures when it is exposed to 212° F. temperatures for 2 minutes. It follows that if the milk product is heated for too long a time at too high a temperature, it fully denatures. To produce a PRO-WHIP a partially denatured product is whipped before its protein is fully or permanently denatured. The tough curds that form, when a milk product is fully denatured, for example, ripened cheese, cannot be whipped into a foam. Surprisingly, the soft curds that form just before a milk product fully denatures into hard curds, whip into and become a useful part of a PRO-WHIP.

Figure 1:
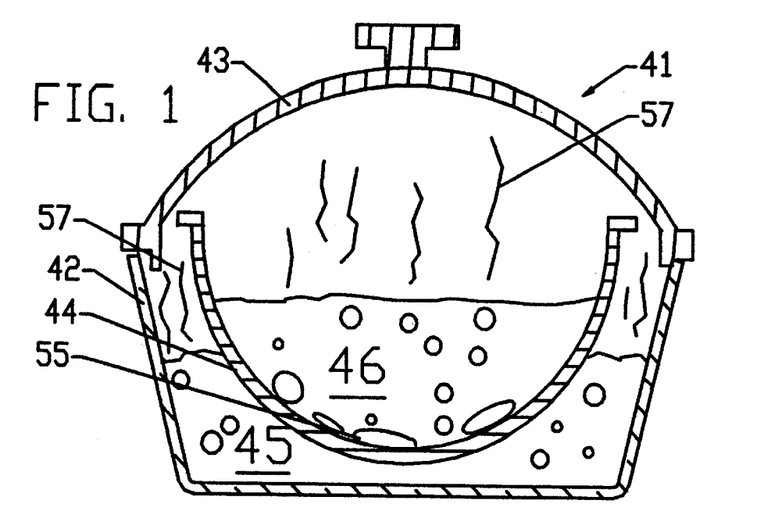
FIG. 1 is a side view, cross-section illustration of a double boiler device.

FIG. 1 illustrates a double boiler 41. Boiler 41 includes an outer pot 42, a cover 43 and an inner pot 44. Inner pot 44 is free to float as a boat in water 45 confined within outer pot 42. A suitable unprocessed milk product 46 is held, at its boiling point, in covered metal inner pot 44 over a gas or electric burner for circa seconds to 20 minutes. Thereafter the heat treated hot milk product may be poured out of inner pot 44. The resulting denatured PRO-WHIP SYRUP is whipped, flavored and otherwise processed to produce a desired PRO-WHIP.

Advantageously, boiling water 45 agitates inner pot 44 stirring and evenly heating natural milk product 46. The vapor rising from boiling water 45 blocks oxygen from reaching the exposed surface of heating milk product 46. This vapor impedes the formation of an unwanted dense skin on the surface of milk product 46. In gas and electric methods some protein 55 precipitates and sticks to the walls of the denaturing pot.

For use in a microwave oven, it is preferred that inner pot 44 be fabricated of a metal. Metal is a good heat exchanger. Metal prevents microwave energy from entering inner pot 44 from its bottom and sides and, protein 55 clinging to pot 44's inner surface will not burn thereon. Advantageously, the exposed metal of inner pot 44, that projects above the surface of milk product 46, acts as a cooling fin that impedes liquid boil over. When used in a microwave oven, outer pot 42 be fabricated of a microwave permeable material. Advantageously, when heated in a microwave oven on a microwave oven turntable, the motion of the rotating table agitates free floating inner pot 44 thereby stirring the natural milk product 46.

The cook decides how dense and how long lasting a foam is desired and may utilize various combinations of methods, herein taught to achieve the desired result. If a dense stable foam is desired, a milk product that is rich in milk protein as evaporated milk, or a quart measure of milk powder mixed with one and a half cups of water, is processed.

The type and amount of milk product, the type, size and configuration of the heating pot, and the intended use of the PRO-WHIP product influences both the heat treating time and the whipping time. Too low a temperature and/or too short a heating time results in an unstable foam. Too hot a temperature for too long a heating time will cause the milk to burn and permanently curdle.

If desired, a partially denatured food product may be stored. Subsequently, when one whips this partially denatured food product, during whipping additional denaturing may be employed, for example adding additional citrus juice to a milk product. In this case, some experimenting may be required to obtain a desired foam production.

During heating a poor fitting cover can result in air hitting the top surface of the milk and the formation of a skin thereon. Permitting a tough skin to form may result in a build-up of steam pressure thereunder and a sudden undesirable eruption of the milk.

Air is free to contact the heat treated milk product as it falls by gravity through a strainer. The air causes a film or skin to form on the strainer as hot milk slowly filter through it. This added film acts with any skin present from the earlier heat treatment of the milk to quickly blocks the strainer. It follows that, when the weight of the milk product is employed to force hot milk through a strainer, multiple strainers or special procedures are required.

To obviate the problem arising from the film or skin that blocks conventional gravity straining, it is preferred to employ the mechanically aided strainer apparatus of FIG. 3. Since the strainer element is operating under water, air cannot reach the milk product to result in film or skin formation. Precipitates fall away from the bottom of strainer 51 in contrast to their building up on the upper surface of and blocking a gravity strainer. Mechanical filtering is faster and more convenient that gravity filtering.

In FIG. 3, to facilitate clean up, the metal strainer screen from a conventional French Press coffee maker is removed and replaced with a loose piece of filter paper 54. Filter paper 54 is held in place by the pressure that the metal spring plunger 51 exerts on the inner walls of container 50. The filter paper 54 may be a paper coffee filter or simply common paper toweling cut to shape.

B. Heat Denaturing Egg Products

To produce a whole-egg PRO-WHIP foam, first a whole unshelled egg and a potable liquid is beaten to blend together the liquid the egg white and the yolk. Then this egg mixture is denatured and whipped. The resultant egg PRO-WHIP looks like a whipped egg white meringue. It differs from a prior-art, "whipped egg white meringue" in that a "whole egg PRO-WHIP" is a blend of a liquid and a shelled whole egg. A "whole egg PRO-WHIP" is novel because prior art teaches that egg white will not whip into a meringue in the presence of small quantities of yolk.

To produce a whole egg PRO-WHIP a shelled egg is mixed with water and is heated to start the egg denaturing process. For example, employing the apparatus illustrated in FIG. 7, water is added to one large shelled egg to produce a 4 ounce mixture and the mixture is exposed to microwave energy. Then, before the egg protein stops denaturing, the whole egg PRO-WHIP SYRUP is whipped into a PRO-WHIP.

It is taught that held for three minutes at circa 150°, an egg soft cooks (e.g., it denatures). Preferably, with the aide of a microwave oven temperature probe, the egg product is heated to over 165° F., (for example, for circa ten seconds) to kill any salmonella bacteria present. When whipped, this results in a "pasteurized" egg PRO-WHIP.

Heating and whipping a shelled whole egg, with a small amount of added liquid or without adding a liquid, results in a prior-art scrambled egg. Surprisingly, heating while whipping a mixture of a shelled whole egg and a circa equal volume of liquid, to its denaturing temperature for a predetermined time results in a stable, high-volume, long-lasting foam.

With practice a prepared egg PRO-WHIP may be placed in a hot frying pan and fried. Since one egg can result in four cups of a prepared egg PRO-WHIP, new skills are required to make a PRO-WHIP fried egg. With practice, a "sun up," similar to a "sunny side up" fried egg may be produced. Since a "sun up" fried egg PRO-WHIP is a pasteurized product, it obviates the danger inherent in eating the raw top of a non-pasteurized, conventional, "sunny side up" fried egg.

Hard cooked eggs and ripened cheese are fully denatured products. Fully denatured products are products whose denaturing cannot be reversed. They cannot be whipped into a PRO-WHIP.

C. Heat Denaturing Milk and Egg Combinations

A milk PRO-WHIP and an egg PRO-WHIP can be independently prepared and thereafter combined into a milk-egg PRO-WHIP.

Preferably, a milk product and an egg product are heat denatured together and, as a mixture, whipped into a PRO-WHIP. For example, first, three ounces of milk are heated to circa 200° F., in a microwave oven, and then a large shelled egg is beaten into the hot milk. Both the cool ambient air and the cool egg, beaten into the hot milk, cools the hot milk below the denaturing temperature of the egg. Whereupon, this warm mixture is heated in a microwave oven until it reaches 165°. Thereafter the mixture is promptly whipped into a pasteurized, egg-milk PRO-WHIP. An egg-milk PRO-WHIP may be consumed hot or cold or it may be frozen for subsequent use. Frozen and properly flavored, the resulting egg-milk PRO-WHIP may be consumed as a replacement for "French ice cream."

Not illustrated, the starting egg-milk product may be heated to its boiling point in a covered metal pot, over a gas or electric burner. Care is exercised that the egg-milk product does not boil out of the pot. The heating mixture may be whipped into a PRO-WHIP while denaturing in the pot.

Undesirably, protein in contact with bottom of the pot burns onto the bottom of the pot from the direct heating of the bottom of the pot by the electric or gas burner. The resulting burned on crust is harder to clean up than a precipitate that coats the bottom of inner pot 44 in a double boiler method.

Preferably, in a double boiler, on a conventional range, one whips either a milk product, an egg and water mixture, or a milk and egg mixture into a PRO-WHIP while it heats, pasteurizes and denatures. The denaturing egg and milk product is whipped until the characteristic tiny stable bubbles and features of a "whip cream" type PRO-WHIP develop.

Whipping the egg or milk product is easy when the product is heating uncovered in a double boiler on a gas or electric range. When whipped from warm to their denaturing temperature, neither the milk nor the egg product crusts and burns onto the bottom of the pot. High speed whipping is not necessary. The burner may be set to medium-low. A proper size pan should be employed as four ounces of an egg and water mixture or four ounces of an egg and milk mixture can result in twenty-four ounces of foam.

A specially designed microwave oven whipping apparatus would be required to whip a denaturing egg or milk product while it is exposed to microwave energy. Presently this required microwave oven whipping apparatus is not available to the homemaker.

In gas and electric cooking, the egg liquid mixture is whipped while heating to limit the amount of egg that burns on the part of the container abutting the heating element. Since microwave heating is bulk heating, the egg liquid mixture can be heated to circa 195° F. without fear of egg protein burning on the bottom of the heating container. The denaturing heated egg is removed from the microwave oven and immediately whipped.

D. Denaturing by adjusting pH of Milk and Egg Products

Milk and egg protein may be denatured by altering its pH, by heat, by mechanical agitation (i.e., high speed whipping) and other conventional means. The denaturing may be the result of combinations of heating, agitating, and altering pH.

An egg or milk product may be denatured by reducing its pH to a pH of circa 4.5 or lower, With milk products, a pH of circa 3.8 is desirable. Many additives may be employed to change or adjust the pH of an egg or a milk product, for example, Cream of Tartar, lemon juice, tomato juice, fruit wines, fruit jellies. Prior art teaches that, if these acid additives lower the pH of milk to 4.5, they will curdle the milk. Surprisingly, if the milk mixture is whipped before these additives undesirably curdle the milk, a flavored PRO-WHIP is produced.

Prior art teaches to add Cream of Tartar to an egg white to enhance its ability to whip into a foam. The Cream of Tartar added in the amounts taught only partially denatures the egg white. This partially denatured egg white is similar to evaporated milk and powdered milk that is partially denatured in its manufacture. It is believed that the partial denaturing of these three products results in the prior art success of whipping these products into useful foams. Here it is taught to lower its pH to a pH of circa 3.5 to 4.5 of a natural or a partially denatured egg or milk product, while further mechanically denaturing it (e.g., whipping into a foam).

An example of the preparation of a raspberry milk PRO-WHIP follows: Four ounces of a milk product and raspberry jelly are mixed together. The raspberry jelly lowers the pH of the mixture. The mixture is whipped and during whipping the pH is lowered to a predetermined pH by the addition of a concentrated acid. The concentrated acid, chosen to lower the pH, may be citric acid to complement the taste of the raspberry jelly. It may be lactic acid or ascorbic acid (vitamin C) to add nourishment. It may be concentrated hydrochloric acid or phosphoric acid to lower the pH without appreciably increasing the water content. It may be a frozen fruit juice concentrate to alter the taste.

Preferably, after mixing in the raspberry jelly, concurrent with whipping the mixture, the chosen acid additive is slowly added while the pH level of the developing PRO-WHIP is monitored using a commercial pH meter. A pH of 3.8 is preferred. There are an assortment of inexpensive pH meters available to measure the pH of the whipping mixture. Once a recipe is formulated, the results are repeatable and the pH meter becomes superfluous.

Without a pH meter, one may determine if a particular milk PRO-WHIP is done by observing the size of the bubbles and by listening to hear if the bubbles are breaking up. For example, without a commercial pH meter, four ounces of a milk and raspberry jelly are mixed together. The raspberry jelly lowers the pH. The mixture is whipped and during whipping the pH is lowered to a predetermined pH by the addition of a concentrated acid. For example, acid is dripped into a whipping, denaturing mixture with an eye dropper. As the acid denatures the milk protein, one can observe the bubbles stop bursting and become smaller and smaller. The PRO-WHIP is done when, after the beater blades are removed, the consistency and texture of the foam is similar to whipped cream and no discernible sound of breaking bubbles is heard. This process is reversible. While it is being whipped, an alkaline solution (for example, a sodium bicarbonate solution) is dripped into this acid formulated PRO-WHIP. As the alkaline solution neutralizes the acid, the bubbles become larger and larger and start breaking up. Once the milk product returns to its natural state, it can no longer be whipped into a useful foam.

E. Additives

Representative useful additives are sweeteners, flavorings, candy, nuts, and mixed dried fruit. Some alkaline materials added to an acid PRO-WHIP foam will destabilize its foam and promptly return it to a liquid.

Many additives, for example, candy, nuts, dried fruit, jellies, marshmallows, fruit (fresh bananas, pears, apples, berries and the like) and other solid products commonly added to ice cream are equally useful added to a PRO-WHIP. Preferably, large pieces of additives are diced into small pieces and frozen in flat sheets. The flat frozen sheets are easily broken into loose, frozen pieces that are mixed into a semi-frozen confection without significantly altering its temperature. Since a PRO-WHIP foam has small mass (e.g., overruns of 300 to 500 percent are expected), large additives, as, for example, unsliced, frozen blueberries, may become too cold to comfortably chew. In contrast, the small additives that are present in strawberry jam and shredded coconut are desirable.

The cook may choose additives: (1) for their taste, as powdered coffee or tea, lemon juice, tomato juice, sugar, sweetener and table salt; (2) to change or adjust the pH as Cream of Tartar, citric acid, hydrochloric acid, lactic acid, ascorbic acid, phosphoric acid, baking soda, et al; and (3) to change consistency and flavor as cooking oil.

For those that desire a fat rich, high calorie PRO-WHIP, measured amounts of sugar and fat may be added to a PRO-WHIP. Saturated fat, as melted butter, may be beaten into a hot PRO-WHIP. This hot butter mixture cannot be whipped into a useful foam until it is chilled. Once chilled it can be whipped into an "improved whipped cream PRO-WHIP" (i.e., a rich in saturated fat and a low-overrun whipped product). Polyunsaturated fat, as Canola oil, may be beaten into a hot or cold PRO-WHIP. Because saturated fat, for example milk fat, is solid at room temperatures, a saturated fat "whipped cream" PRO-WHIP has different properties than non-fat, low fat and polyunsaturated fat PRO-WHIPS.

Surprisingly, vegetable fat whips easily into a PRO-WHIP, even a PRO-WHIP prepared from a milk product with a moderate amount of milk fat. A PRO-WHIP, prepared with a vegetable oil, may be produced that, except for its superior overrun, tastes and appears as if it is a conventional whipped cream. It is preferred to add a vegetable oil that does not have a strong flavor of its own. For example the flavor of corn oil is easily discernible while the flavor of Canola oil is not easily discernible. Many will choose polyunsaturated vegetable fat over saturated milk fat.

Many things will return a denatured milk protein to its natural state. Hence, the whipped foam of some PRO-WHIP preparations, stored for a period of time, become unstable. In such cases, repeating the denaturing process and again whipping the denatured syrup may restore the useful foam. Freezing delays this return to a natural state.

If too much water is added, water drains out of the foam and settles on the bottom of the whipping container under the foam. The cook selects the amount of water required to produce a desired result. With practice, the cook can control the relative volume of foam in respect to the volume of liquid thereunder.

If not enough water is added, the PRO-WHIP SYRUP may be too viscous to whip. If the PRO-WHIP SYRUP is too viscous or a desired additive with too much mass is added too early, the beater may be slowed below an effective whipping speed. A liquid, as water or milk, may be whipped into a viscous mix to increase whipping speed and to increase the amount of foam.

F. Preparation of an Unripened Cheese PRO-WHIP

Unripened cheese, for example farmers cheese and cottage cheese, may be returned to their natural state by adding water, heat and additives. It takes circa six quarts of milk to produce sixteen ounces of cottage cheese. Old fashion cottage cheese is a concentrated source of protein and is low in milk sugar and butter fat. These are desirable attributes for those seeking a diet PRO-WHIP.

The cheese is placed into container 50 of the apparatus of FIG. 2. A predetermined amount of milk is added and the mixture is stirred. The amount of milk must be enough to raise the alkalinity of the mixture to the natural state of cheese protein.

The cheese curd and milk mixture is heated until it reaches the naturing temperature of the cheese. The heat source is reduced and the mixture is left to simmer for a predetermined time. Thereafter the resulting liquid is poured off into a suitable whipping bowl and denatured and whipped to produce a PRO-WHIP.

Not all store bought cottage cheese is suitable for the naturing and subsequent denaturing described. Some "cottage cheese" is manufactured using rennin to denature the casein protein. In both rennin and "cultured" "cottage cheese" the milk protein may be permanently altered which makes it, as is the protein found in ripened cheese, unsuitable for the processing herein taught.

G. Alcoholic Beverages and Frozen Alcoholic Dessert PRO-WHIPS

If an alcoholic beverage is whipped into an established PRO-WHIP, the resulting product may be consumed hot, cold or frozen. Sangria, Saki, heavy sweet wine, and whiskey add flavor and alcoholic content to a PRO-WHIP. Vodka can be added, alone or in combination with a flavored alcoholic beverage, to increase its alcoholic content. Surprisingly, the water content of an alcoholic beverage, can be employed in place of the water normally added to a powdered milk to liquefy it for whipping or in place of water that may be added to increase the volume of a foam.

Champagne added to an established heavy cream PRO-WHIP releases its trapped carbon dioxide bubbles into the PRO-WHIP. A preponderance of the bubbles released by the champagne (or a soda) become trapped in viscous heavy cream whip and results in an increase in volume and alcoholic content.

A frozen heavy cream PRO-WHIP is hard to penetrate with a spoon. Surprisingly, if the heavy cream PRO-WHIP is prepared, in combination with an alcoholic beverage, and frozen, it can be easily spooned out of the container in which it was frozen.

H. Preparation, Storage and Serving

Figure 6:
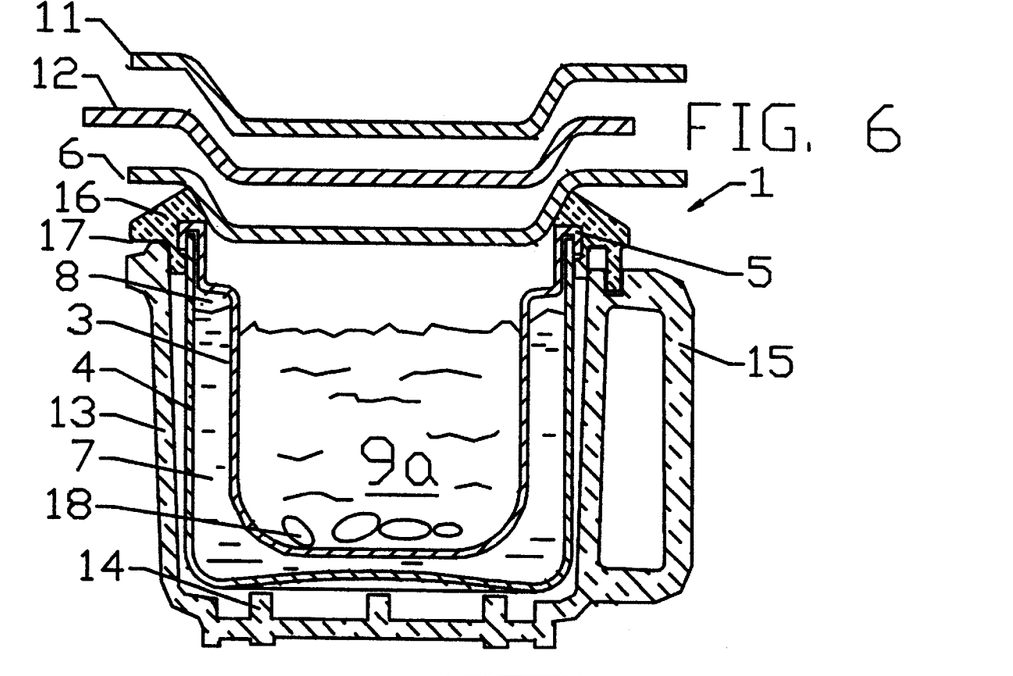
FIG. 6 is a side view, cross-section illustration of the whipping, freezing container of FIG. 4 where the mixer is replaced with three stacking-lid serving containers.

FIGS. 4 and 6 are a side view, cross-section of a whipping-freezing and/or serving vessel 1 which includes a double-walled cylindrical vessel consisting of an inner vessel cup member 3 and an outer vessel cup member 4 each having an upper open end and a closed bottom. Preferably, vessel cup members 3, 4 are made of thin metal, e.g., 2 to 250 mils. The upper ends of the inner and outer vessel cup members 3, 4 are hermetically sealed by shaping the rim of at least one of the vessel cup members to form a seam 5 with the rim of the other vessel cup member.

A chilling agent 7 substantially fills the chamber defined by cup members 3, 4. The chilling agent typically is a brine mixture of rock salt and ice particles. An air space 8 is maintained over chilling agent 7 to avoid deforming vessel cup members 3, 4 as a result of thermal expansion and contraction.

In FIG. 6, one or more saucer-shaped, serving dishes or cover members 6, 11, 12 of microwave-transparent material, for example, ceramic saucers, are provided to cover the vessel while the vessel is in a freezer. When the vessel is removed from the freezer, the saucers 6, 11, 12 may function as chilled serving saucers to receive and dispense serving portions of frozen confection 10.

To support inner vessels 3, 4 an outer receptacle 13, made of an appropriate molded plastic material, is provided. The outer receptacle 13 is adapted to receive and support vessels 3, 4 with an appropriate clearance between the bottom of its inside wall and the cylindrical wall of outer vessel cup member 4. A plurality of supporting ribs or buttons 14 are provided on the inner wall of the bottom of outer receptacle 13. A handle 15 for the receptacle 13 facilitates manipulation and support of the receptacle 13.

To provide a removable member that secures and seals receptacle 13 to vessels 3, 4 and at the same time provides a soft, secure support surface for serving-saucer/vessel-cover 6, a soft flexible coupling ring 16 is provided. Ring 16 has a peripheral shoulder portion 17 snugly engaging the rim of receptacle 13. Ring 16 snugly receives seam 5 of vessels 3, 4.

During the operation of the device, to prevent relative rotation of vessels 3, 4 with respect to the receptacle 13, a rotation prevention means, depending lug 19, is formed on the lower surface of ring 16. Lug 19 is received in the rotation preventing recess 20 formed on the upper portion of receptacle handle 15.

FIG. 4 is a side view showing double-wall, cylindrical vessel 1 and a conventional, high-speed, hand mixer 21. Mixer 21 is equipped with a plastic spatula 22. Spatula 22 is removable and mounted and secured on mixer 21's beaters 23. Preferably, beater 23 has blades that are fabricated of plastic to avoid damaging the inner vessel cup member 3.

Brackets 24, extending from the upper surface of handle 15, provide a support for mixer 21 when it is not in use.

Figure 5:
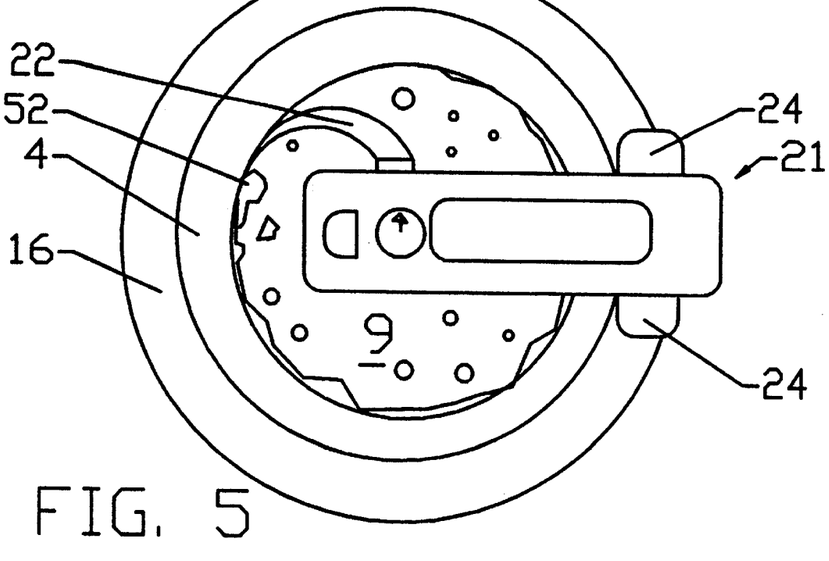
FIG. 5 is a top view of the structure of FIG. 4.

In FIGS. 4, 5, 6 double-walled vessel 1 is chilled in a freezer, e.g., the freezer section of a refrigerator or a stand-alone freezer. A chilling agent 7 establishes a temperature of about 5° F. (−15° C.). The chilled vessel 1 is removed from the freezer and a predetermined amount of PRO-WHIP SYRUP 52 (illustrated with dash lines) is placed in the inner vessel cup member 3. A thin layer of PRO-WHIP SYRUP 52 freezes on the inner surface of inner vessel member 3. Thereafter syrup 52 is whipped by high-speed mixer 21. As seen in FIGS. 4 and 5, during whipping intervals, the high-speed mixer is positioned so that a spatula 22 scrapes, as it freezes on, frozen syrup 52 and foam off the inner surface of inner vessel member 3. This frozen, scraped off material mixes into the whipping PRO-WHIP 9 and aids in its speedy, uniform freezing. NOTE: The numeral 52 denotes the PRO-WHIP SYRUP in the inner vessel cup member 3 and the numeral 9 denotes the same syrup whipped into a PRO-WHIP.

Certain PRO-WHIP frozen confections, freeze so hard that they cannot be easily scooped out of inner vessel 3 with a spoon. Surprisingly, rigid, hard-frozen, whipped, heavy-cream, confection 9a can be selectively heated in a microwave oven so that it may be scooped out, with an ice cream scoop, and thereupon served as a frozen confection. This rigidly-frozen confection 9a, in inner vessel 3 of double walled cylindrical vessel 1, is placed in a microwave oven (not shown) and exposed to microwave energy for a predetermined time. Note: the preferred metal walls of vessels 3, 4 are microwave reflective. The cover-member, serving dishes 6, 11, 12, are not microwave reflective and are non-lossy. Exposed to a predetermined amount of microwave energy, starting from the top and progressing to the bottom, frozen confection 9a will soften. Care must be taken in selecting the size of the upper opening and the cavity size of the inner vessel cup member 3 so that microwave energy will not be prevented from reaching the bottom of inner vessel 3. Advantageously, after it is exposed to microwave energy, any soft whipped-cream confection that was not promptly scooped out of inner vessel 3 quickly refreeze.

This method permits convenient long term storage of frozen whipped cream and similar rigidly frozen products. This method permits the rapid defrosting of a rigidly frozen confection into individual serving portions that are easily scooped out of inner vessel 3 and thereafter provides for the unattended, speedy refreezing of any soft confection not scooped out. And if cover-member, frozen, serving dishes 6, 11, 12 are employed, they provide a useful way to hold, transport and/or serve cold, the individual portions of the scooped-out confection.

Another advantage that stems from being able to defrost a frozen PRO-WHIP, frozen in vessel 3, in a microwave oven, while shielding freezing mixture 7 from microwave energy, is that, when a hot PRO-WHIP foam is poured into frozen vessel 1 and allowed to freeze, it may partially collapse during freezing. It is believed that when the hot air, in the bubbles, of a hot foam cools, the bubbles break as the air contracts. Thereupon this unsatisfactory frozen PRO-WHIP is exposed to microwave energy in vessel 1 until it is semi-frozen. And in vessel 1, it is again whipped into a satisfactory foam. Thereafter this semi-frozen PRO-WHIP quickly freezes into a satisfactory frozen confection.

When it is time to prepare a different confection therein, one must first clean out the unused frozen confection left in vessel 3. So that chilling agent 7 will remain frozen and ready to freeze a new confection, the chilled vessel 1 is exposed to microwave energy until the unwanted remains, of frozen-hard confection in vessel 3 become soft. Thereafter water is added to rinse these defrosted remains out of vessel 3. If this heating-cleaning process is performed quickly, the chilling agent 7 does not have time to defrost. Note: the chamber containing chilling agent 7 is surrounded by metal surfaces that shield it from microwave energy.

For repetitive whipping therein of similar PRO-WHIP SYRUPS, it is recommended that vessel 1 should not be cleaned after each use but, instead, some frozen-hard product should be retained as a coating on its inner walls to initiate cooling of the next preparation. This procedure accelerates the preparation of each subsequent similar confection.

By proper selection of the amount and type of chilling agent 7 during a serving interval, vessel 1 and contents may be placed on a dining table as a cold-maintaining, serving platter of frozen confection. The frozen confection maintains its intended consistency until chilling agent 7 has defrosted.

Vessel 1 has multiple utility. When not in use, as taught supra, vessel 1, per se, may be used with its supply of cold saucer-covers 6, 11, 12 as a cold-maintaining serving platter that includes a supply of cold saucers available for serving cold desserts therefrom.

There are many containers suitable for preparing, freezing, storing and serving a PRO-WHIP therein. Vessel 1 is a preferred way to prepare, freeze, store and serve frozen PRO-WHIP therein.

In FIG. 7, preferably cup 25 is constructed of microwave-permeable material as plastic, ceramic, glass or paper. Preferably, cup 25 can be used to heat denature, in a microwave oven, an egg or milk product therein. Cup 25 is designed to accommodate the beater blades of high speed mixture 21. Cup 25's high walls contain the initial splatter inherent in whipping small quantities of PRO-WHIP SYRUP. Four ounces of a PRO-WHIP SYRUP may produce 16 to 20 ounces of PRO-WHIP. Hence, a cup 25, that holds 16 to 32 ounces, is preferred. If a hot PRO-WHIP is desired, four ounces, of a starting egg or milk product is heat denatured and then whipped into 16 ounces of PRO-WHIP.

Thick, stable foams are easily frozen in single serving cups 25. If required, just as unstable foams are again whipped, in freezing vessel 1, in their semi-frozen state, foams may benefit from being whipped a second time, in cups 25, in their semi-frozen state. If the cook wishes to provide frozen individualized desserts, PRO-WHIP may be prepared and frozen in multiple, prechilled cups 25.

From a supply of differently-flavored, refrigerated PRO-WHIP SYRUPS, multiple cups 25 permits the cook to quickly prepare and hand out, to multiple diners, individualized portions to accommodate each diner's preference. If the PRO-WHIP is hard frozen and no longer hand scoopable, an accessory, microwave-reflective jacket 26 can be provided for cups 25 to permit microwave defrosting of individual serving portions frozen PRO-WHIP by exposing cup 25's open top to microwave energy.

Compared to conventional ice cream, the PRO-WHIP, flavored products, of this invention, are inexpensive. A twelve fluid ounce can of evaporated milk, may yield a four-fold volume increase of whipped confection. Evaporated milk has twice the butter fat of milk and produces a moderately high-fat, frozen confection. Less expensive, powdered skim milk makes a relatively low fat, low calorie frozen confection.

L. PRO-WHIP Storage Container and Serving

Figure 8:
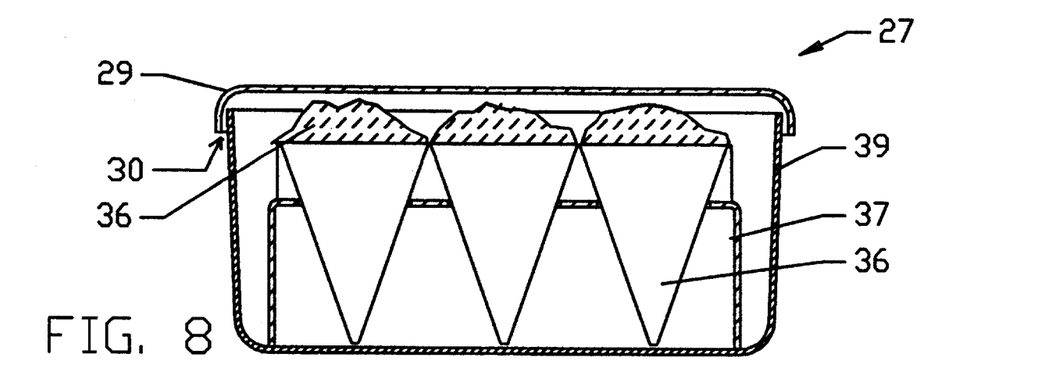
FIGS. 8, 9, 10 illustrate a device for supporting individual containers of PRO-WHIP during freezing and frozen storage. The device may be used to refrigerate assorted flavors of PRO-WHIP or PRO-WHIP SYRUP for subsequent use. The device may be used outside a refrigerator or freezer, as a covered cooler, during a transporting and a serving interval.
Figure 9:
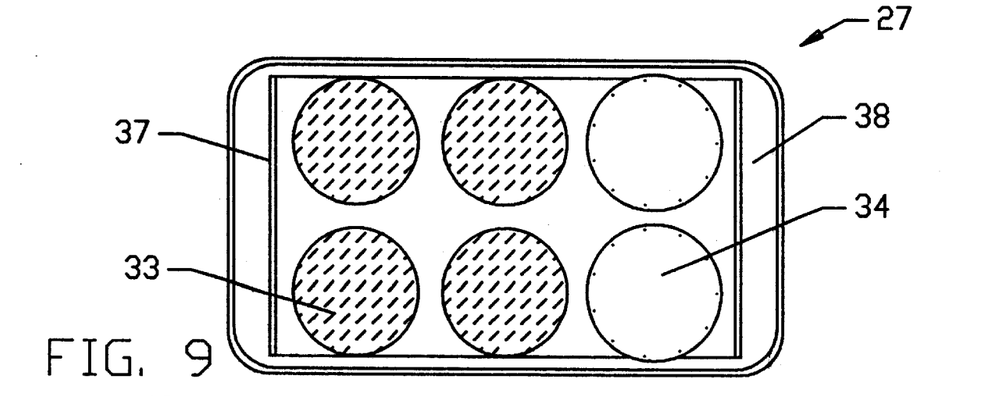
Figure 10:
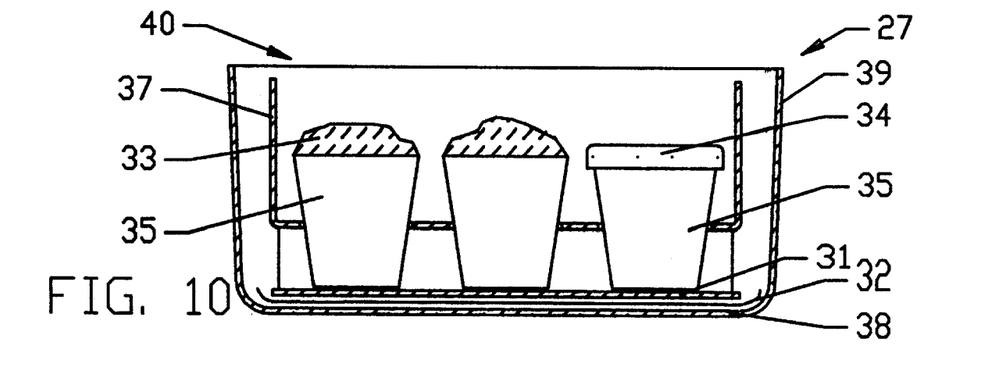

In FIGS. 8, 9, 10 a freezing, storing and/or serving box 27 is provided for those who desire premeasured, individual containers of frozen PRO-WHIP. The serving box 27 contains a metal sheet 31, preferably aluminum, resting on wet paper 32 or other water retaining material such as a sponge, porous plastic fabric and the like. The serving box 27 has an open top 40, a base 38 and upright sidewalls 39. The serving box 27 is formed from metal, plastic, cardboard or any convenient material which is a vapor barrier material.

In operation, box 27 is placed in a freezer until wet paper 32 becomes frozen with aluminum sheet 31 in intimate contact thereon. Cups 35, containing PRO-WHIP 33, are placed in chilled box 27 in contact with metal sheet 31. Metal sheet 31 and frozen paper 32 function as a heat-sink designed to speed the freezing of a PRO-WHIP 33 placed into box 27.

The box 27 can be used as a cold serving device. The metal sheet 31 and frozen paper 32 function as a cold heat-sink so that the box 27 will remain cold after removal from a freezer.

A PRO-WHIP, stored in a freezer for an extended period of time, tends to degrade. Cover 29 and sealing means 30, of FIG. 8, will improve storability of the frozen confection. Cover 29 mates with the open top 40 of box 27 and is formed from metal, plastic, cardboard or any convenient material which is a vapor-barrier material. Cover 29 has flanged edges which can form a vapor resistant seal 30 with box 27. The sublimation of frozen water (e.g., ice in paper 32) within the sealed box slows the degradation, sometimes called "freezer burn," of the frozen confection.

FIG. 10 illustrates multiple three ounce plastic cups 35 containing frozen PRO-WHIP 33. An invertible rack 37 is provided to support and position cups 35. Rack 37 is placed in freezing, storage, and serving box 27. Because the bottom of the PRO-WHIP 33, in cup 35, is in intimate thermal contact with aluminum sheet 31, the bottom of PRO-WHIP 33 is rapidly frozen. This rapid freezing, from the bottom up, freezes in place liquid that, otherwise, would drain from some formulations of PRO-WHIP foam before they are fully frozen. A cover 34 may be provided on cup 35 to improve storage life and facilitate service.

In FIG. 8, invertible rack 37 corresponds to invertible rack 37 of FIG. 10. In one orientation, invertible rack 37 supports paper or plastic cones 36 and prevents tipping or cone-to-cone contact. Cones 36 contain frozen PRO-WHIP 9. The frozen PRO-WHIP can be consumed directly from paper cone 36, or squeezed out of paper cone 36. Paper cone 36 can be unraveled as frozen PRO-WHIP 9 is consumed.

It will be observed that invertible rack 37 will support relatively short containers (cups 35) in one position, and will support relatively tall containers (cones 36) in an alternative inverted position.

J. Coffee, Tea and Chocolate PRO-WHIP

The apparatus and methods described, in FIGS. 2, 3 may be used to make a "whipped-coffee-milk" that, hot, appears and tastes like cappuccino coffee; that, cool, appears and tastes like a coffee milk shake, and when frozen, appears and tastes like coffee ice cream. Surprisingly, a cappuccino type PRO-WHIP coffee beverage may be prepared without water from a mixture of whole milk and coffee grounds.

Some may prefer to whip the PRO-WHIP SYRUP into an all foam confection and some may prefer only a small amount of PRO-WHIP foam covering a beverage. The time and speed of whipping controls the amount of foam produced in relationship to the amount of beverage thereunder.

If it is desired to prepare each element of a cappuccino type beverage independently, a PRO-WHIP is scooped or poured onto a conventional coffee prepared from hot water and coffee grounds. Alternately, a powdered coffee and milk product mixture may be whipped, while lowering its pH to circa 3.8, into a cool beverage type PRO-WHIP. Note: coffee, per se, is acidic. Hence, less acid additives are required to lower coffee milk to the circa a pH of 3.8.

The apparatus and methods described may be used to make a "whipped-tea-milk" that, cool, appears and tastes like a "tea milk shake" and that can be partaken hot, chilled or frozen. This "foamed-tea-milk" is made by adding loose tea leaves or tea bags to a suitable raw milk product prior to denaturing it, as described supra, into a PRO-WHIP SYRUP.

The apparatus and methods described may be used to make a whipped, chocolate milk beverage that, cool, appears and tastes like a chocolate milk shake and that, frozen, appears and tastes like chocolate ice cream. This "foamed-chocolate-milk" beverage is made by adding cocoa powder to a suitable raw milk product prior to denaturing it into a PRO-WHIP.

K. General Comments

It is expected that some will lower the pH sufficiently or heat treat and, while denaturing, whip long enough to produce a "PRO-WHIP foam cheese". Like cottage cheese, the "PRO-WHIP foam cheese" soon separates and rises above a liquid component. Once separated from this liquid component, a PRO-WHIP foam cheese is employed as conventional cheese.

A frozen, flavored, egg-white, skim-milk, vegetable-fat PRO-WHIP is in contemplation. This diet, polyunsaturated-fat PRO-WHIP can be formulated to simulate French ice cream.

It is expected that some may wish to replace enzymes, vitamins, minerals, and the like, destroyed by the heat processing and freezing taught, with conventional replacements and supplements.

In place of the apparatus available to a homemaker described, it is expected that some will employ laboratory, commercial, and manufacturing equipment. For example, heavy duty ultrasonic generators may be employed to cavitate (e.g. foam) milk products while they are denaturing.

L. Additional Examples

Cheese

Various cheeses can be returned to their liquid state by adding milk (e.g. whole milk, cream, and skim milk) and heat. Examples include mixtures of milk and 1) farmers cheese, 2) cream cheese, 3) Muenster cheese, 4) cheddar cheese, 5) Swiss cheese, and the like. Diced cheese is mixed with an equal volume of whole milk, cream, or skim milk. The mixture is mixed and heated. The cheese liquefies. Then this hot liquid mixture is denatured and whipped into a PRO-WHIP as taught supra. The resulting "whipped foam cheese" has the flavor of starting cheese and can be employed as a spread for crackers or as a sauce for other foods.

Milk Foams

Many common acidic foods may be employed to denature milk and achieve a stable foam. Concentrated frozen orange juice may be whipped into a milk product to prepare an orange juice-milk PRO-WHIP food product, with the familiar taste of both the milk and the orange juice. In operation, a half cup of milk is mixed with a teaspoon of frozen concentrated orange juice. The mixture is whipped to yield a stable, orange flavored foam product. The orange juice-milk product is useful as a drink, as a dessert or as a topping for other foods. In a similar manner, tomato juice, lemon juice and grapefruit juice may be whipped with milk or cream. In operation, a frozen concentrate fruit juice is spooned into a whipping milk product until a predetermined amount of PRO-WHIP foam is obtained.

A fresh grapefruit or an orange may be squeezed and the resulting juice and pulp whipped into fruit-milk PRO-WHIP.

The grapefruit or orange juice is whipped while slowly adding a milk product, for example, evaporated milk, thereto.

A HIGH CALORIE CHOCOLATE DRINK

Eight ounces of whole milk is mixed with one package (1.25 ounces) powdered chocolate milk mixture having the following formula:

sugar, non-fat dry milk, partially hydrogenated coconut oil, corn syrup solids, Dutch cocoa (processed with alkali), sodium caseinate, cellulose gum, salt mono and diglycerides, artificial flavor, sodium citrate, dipotassium phosphate, carrageenan.

The milk is heated to circa 199° F. in a microwave oven using its built in thermometer to signal when the heating is completed. Before the hot mixture can fully denature, the mixture is whipped, resulting in, at least, a two-fold volume increase.

A CONTROLLED CALORIE CHOCOLATE DRINK

Eight ounces of whole milk is mixed with a heaping teaspoon of "Hershey's" cocoa (100% pure) chocolate powder and circa one ounce of Canola oil. The addition of sweetener or sugar is optional. The mixture is heated to circa 199° F. in a microwave oven using its built in thermometer to signal when the heating is completed. Before the hot mixture can fully denature, the mixture is whipped, resulting in, at least, a two-fold volume increase.

A Low Calorie Chocolate Drink

Repeat the previous procedure labeled CONTROLLED CALORIE CHOCOLATE DRINK without sugar or cannula oil. A reconstituted powdered milk or evaporated milk may be substituted for the whole milk.

EGG PRODUCTS

Eggs are available as fresh whole eggs, fresh egg whites, fresh egg yolks, reconstituted powdered egg whites, reconstituted powdered egg yolks and reconstituted powdered whole eggs.

In order to prepare a PRO-WHIP from a commercial liquid or powdered egg product, it is necessary to add a liquid, for example, milk or water to this egg product and to whip this egg product mixture while concurrently heating or adjusting the pH for denaturing. Example, to make an egg-coffee PRO-WHIP mix an egg product and hot coffee and whip. A coffee-egg PRO-WHIP foam will form on the top of an egg flavored coffee.

The same procedure may be repeated with egg yolks and milk; whole eggs and milk; reconstituted powdered egg whites, reconstituted powdered egg yolks, reconstituted powdered whole eggs.

BLOOD AND MEAT

Surprisingly, 1) the by-products remaining, after a meat is cooked, that were collected in the microwave shielded chamber of the MICROWAVE OVEN BAKING UTENSIL, taught in U.S. Pat. No. 3,985,990, 2) blood squeezed from meat, 3) ground meat and combinations thereof when heat denatured, as taught supra, whip into a meat PRO-WHIP foam that is comparable to the egg and milk foams described supra. Combinations of egg, milk and meat PRO-WHIP foams are in contemplation.

It is understood that the above described apparatus and methods are illustrative of the application of the principal of the invention. Many other arrangements and methods may be devised, by persons skilled in the art, without departing from the spirit and scope of the invention. Accordingly, it is to be understood that the present invention is to be limited only by the spirit and scope of the claims that follow.

I claim:

1. A process for making a stable expanded foam food product from denaturable mammal or bird foodstuff which is not fully denatured wherein said mammal foodstuff is selected from the group consisting of skim milk, whole milk, light cream, evaporated milk, reconstituted dried milk and mixtures thereof, and wherein said bird foodstuff is selected from the group consisting of whole egg, egg yolk, reconstituted powdered whole eggs and reconstituted powdered egg yolk, the process consisting essentially of the steps of:

employing means to denature said mammal or bird foodstuff, and concurrently whipping the denaturing mammal or bird foodstuff into said expanded foam food product that is at least twice the unwhipped volume of said foodstuff.

2. The process of claim 1, wherein said denaturable foodstuff is a mixture of said mammal and bird foodstuff.

3. In the process of claim 1, that further includes the step of introducing an alcoholic beverage into said denaturable foodstuff before, during or after said foam food product is completed.

4. A process for making a stable, expanded, foam food product from denaturable mammal foodstuff which is not fully denatured, wherein said mammal foodstuff is selected from the group consisting of skim milk, whole milk, half and half milk, light cream, evaporated milk, reconstituted dried milk, and mixtures thereof, the process consisting essentially of the steps of:

lowering the pH of said denaturable mammal foodstuff below 5 to denature said denaturable mammal foodstuff, and concurrently whipping said denaturable mammal foodstuff into said foam food product that is at least twice the unwhipped volume of said foodstuff.

5. The process of claim 4, wherein said denaturable foodstuff is whole milk containing two to four percent fat by weight.

6. The process of claim 4, wherein said denaturable foodstuff is a mixture of at least two of said mammal foodstuff.

7. The process of claim 4, wherein said denaturable foodstuff is a mixture of powdered milk dispersed in aqueous liquid.

8. In the process of claim 4, that includes the steps of: selecting at least one of said mammal foodstuff, and adding a fat to said selected foodstuff.

9. The process of claim 8, wherein said fat is an unsaturated fat.

10. The process of claim 9, wherein said unsaturated fat is a vegetable oil.

11. The process of claim 10, wherein said vegetable oil is Canola oil.

12. The process of claim 8, wherein said fat is a saturated fat, that includes the steps of: heating said mammal foodstuff to a temperature that liquefies said saturated fat and then beating said heat liquefied fat into the heated mammal foodstuff and then chilling the resultant mixture before said whipping.

13. The process of claim 12, wherein said liquefiable fat is butter.

14. The process of claim 4 that includes a step of adding chocolate flavoring to said mammal foodstuff.

15. The process of claim 4 that includes the added step of whipping said denaturable foodstuff in an open-top receptacle having a capacity of at least 22 liquid ounces and having an open-top at least 4 inches in diameter.

16. The process of claim 15 that includes a step of leaving a predetermined amount of a frozen denatured food product in said receptacle before whipping said denaturable foodstuff in said receptacle.

17. The process of claim 15 herein said receptacle has a bottom wall and side walls shielded from microwave energy and said food product to receive microwave energy through said open top when said food product is in said receptacle, further includes the steps of:

freezing said food product in said receptacle until said food product becomes a frozen, whipped, foam food which is difficult to remove from said receptacle with an ice cream scoop and exposing said receptacle containing frozen whipped, foam food to microwave energy to soften said frozen, whipped, foam food so that said frozen food can be removed easily with an ice cream scoop.

18. The process of claim 4 that includes the steps of:

lowering the pH of said foodstuff until said foodstuff is less than a pH of 4.0, and concurrently whipping said foodstuff into a foam that is at least three times the unwhipped volume of said foodstuff.

19. The process of claim 18, that includes, before lowering the pH of said foodstuff selected from the group consisting of skim milk, whole milk, half and half milk, light cream, evaporated milk, reconstituted dried milk, and mixtures thereof, adding an egg foodstuff selected from the group consisting of whole egg, egg yolk, egg white, reconstituted powdered whole egg, reconstituted powdered egg yolk and reconstituted powdered egg white.

20. A process for making an increased volume, improved shelf life, expanded, foam food product from a partially denatured foodstuff selected from the group consisting of skim milk, whole milk, cream, unripened cheese, evaporated milk, and reconstituted dried milk, the process consisting essentially of the steps of:

employing means to further denature said foodstuff and, while further denaturing said foodstuff, whipping said further denaturing foodstuff into said increased volume, improved shelf life, expanded-foam food product.

21. The process of claim 20, wherein said foodstuff is said unripened cheese that includes the steps of adding an additive to raise the alkalinity of said cheese to return said unripened cheese to the natural, liquid state of said cheese and then employing said means to denature said liquid state cheese while whipping said denaturing liquid state cheese into said increased volume, expanded-foam food product.

22. The process of claim 20, wherein said cream is heavy whipping cream.

23. A process for making a stable expanded foam food product from denaturable mammal or bird foodstuff which is not fully denatured, said mammal foodstuff is selected from the group consisting of skim milk, whole milk, light cream, evaporated milk, reconstituted dried milk, and mixtures thereof, and said bird foodstuff is selected from the group consisting of whole egg, reconstituted powdered whole egg, egg white, reconstituted powdered egg white, egg yolk, and reconstituted powdered egg yolk, the process consisting essentially of the steps of:

heating at least one of said denaturable mammal or bird foodstuffs to at least its denaturing temperature to denature said denaturable foodstuff, and whipping said denaturable foodstuff into said expanded foam product, that is at least twice the volume of said unwhipped foodstuff, while said denaturing is carried out.

24. In the process of claim 23, carrying out said heating and said whipping in a double boiler.

25. The process of claim 23, wherein said denaturable foodstuff is whole milk.

26. In the process of claim 23, that further includes the step of:

mixing said bird foodstuff with a potable liquid to form a mixture prior to the heating step.

27. The process of claim 26, wherein said potable liquid is water.

28. The process of claim 26, wherein said potable liquid is an alcoholic beverage.

29. In the process of claim 26, that further includes the step of heating the mixture to a pasteurizing temperature.

30. An expanded foam, food product, characterized in that the consistency and texture of said foam is analogous to whipped heavy cream made by the process of claim 1.

31. A stable, expanded-foam, food product made by the process of claim 23, wherein a predetermined amount of a potable liquid is mixed with said foodstuff prior to said heating so that said stable, expanded-foam food product separates and rises above at least a portion of said potable liquid.

* * * * *